(No Model.)
E. J. KLINCK.
COMBINED BICYCLE SUPPORT AND MUD GUARD.
No. 541,762. Patented June 25, 1895.
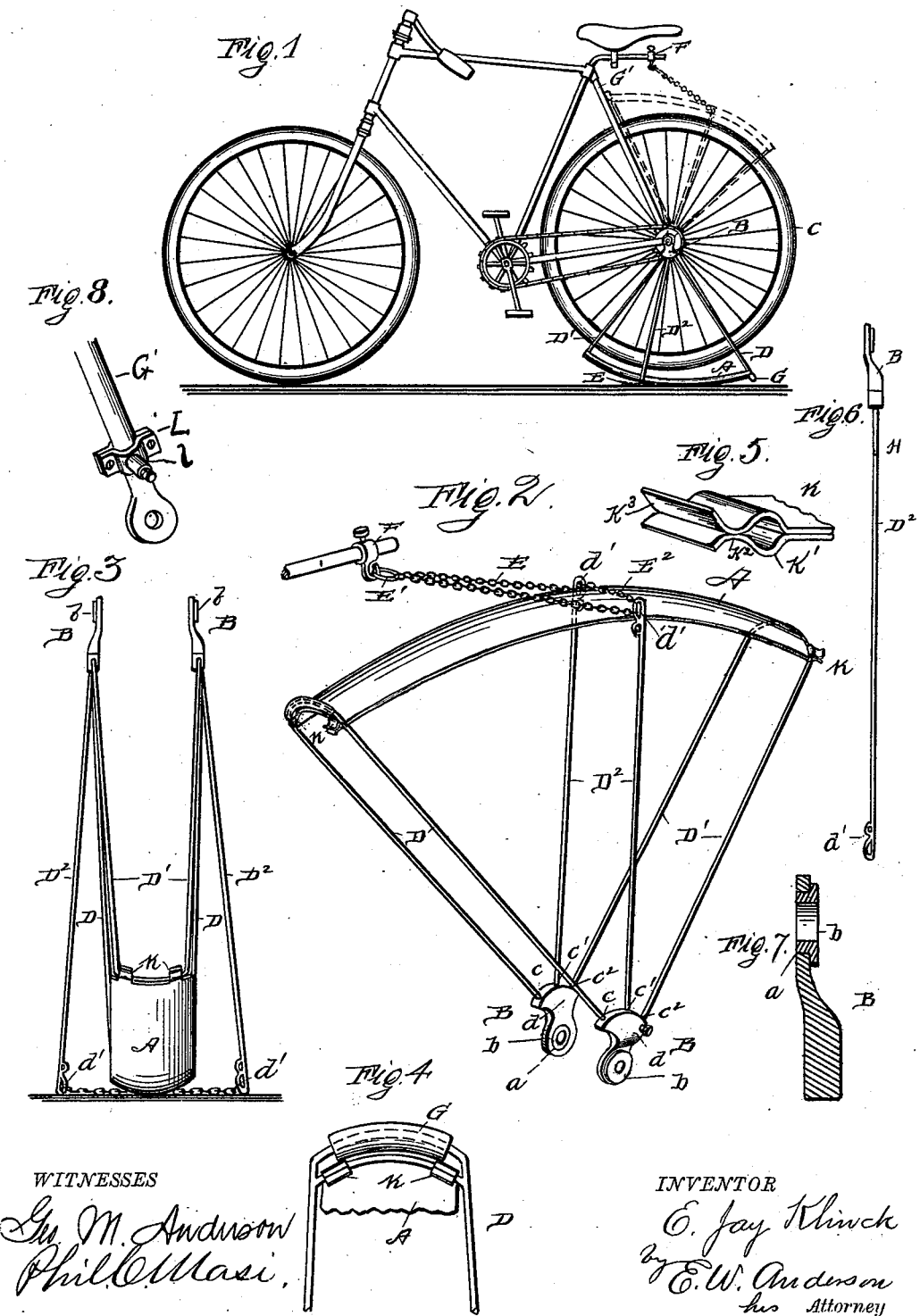
WITNESSES
Geo. M. Anderson
Phil C. Masi
INVENTOR
E. Jay Klinck
by E. W. Anderson
his Attorney

UNITED STATES PATENT OFFICE.

EDWIN JAY KLINCK, OF UTICA, NEW YORK.

COMBINED BICYCLE SUPPORT AND MUD-GUARD.

SPECIFICATION forming part of Letters Patent No. 541,762, dated June 25, 1895.

Application filed January 31, 1895. Serial No. 537,129. (No model.)

*To all whom it may concern:*

Be it known that I, EDWIN JAY KLINCK, a citizen of the United States, and a resident of Utica, in the county of Oneida and State of New York, have invented certain new and useful Improvements in a Combined Bicycle Support and Mud-Guard; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a side elevation of the invention applied, its raised position being indicated in dotted lines. Fig. 2 is a perspective view of the attachment as it appears when swung around over wheel, the seat post being shown broken off. Fig. 3 is a front view of the attachment in position to support bicycle. Fig. 4 is a detail end view of one end of bar D. Fig. 5 is a detail of one of the split spring clips. Fig. 6 is a detail view to show hinge which may be in bars $D^2$. Fig. 7 is a section through one of the socket pieces B. Fig. 8 is a perspective view showing one of clips L applied to fork of rear wheel.

This invention relates to a combination mud guard attachment and support for bicycles, the object being to provide a mud guard of simple and effective character which is capable when the machine is at rest of being readily and easily adjusted into such position that it forms a support to hold the bicycle in upright position wherever the rider may leave it.

With this object in view, the invention consists in the novel construction and combination of parts, all as hereinafter described and pointed out in the appended claims.

Referring to the accompanying drawings the letter A designates the cover or guard proper which preferably consists of a thin plate of metal bent longitudinally to conform approximately to the arc of the wheel, and also arched transversely. I prefer to construct this plate from aluminum owing to the lightness and other well known properties of this metal, but any suitable material, metallic or non-metallic may be employed. This cover or guard is supported by means of a sector-shaped frame constructed in the following manner.

B, B, are two socket pieces, each of which has formed in one end portion a circular opening $a$, in which is loosely fitted a flanged washer or bushing $b$. In the form of the invention now being described, and shown in Figs. 1 and 2, these socket pieces are loosely fitted upon lateral extensions of the axle of the rear wheel C of the bicycle one at each side, being secured by nuts which seat against the flange of the bushing $b$, permitting said socket pieces to turn freely. The opposite portion of each part B is formed with a series of three end sockets $c$, $c'$, $c^2$.

D designates a rod or wire, which is bent into U-form, its ends being permanently fixed in the respective sockets $c$ of the two pieces B, B, said rod supporting one end of the covering. D' is a second and similar rod which supports the opposite end of the covering and whose ends are secured in the sockets $c^2$ by set screws $d$.

$D^2$, $D^2$ designate two intermediate rods or wires, which are nearer to the rod D' than they are to the rod D. The inner ends of these rods are secured in the sockets $c'$, and their outer ends are bent to form double eyes or loops $d'$. To these loops are attached the ends of a small chain E, the central portion of which has a ring E' designed to engage a hook upon the bicycle frame to support the device in the position in which it acts as a mud guard. A convenient construction and arrangement of this hook is shown at F in the accompanying drawings wherein a slidable sleeve is indicated as being secured on the upper portion of the seat post by means of a set screw, said sleeve having a hook projection for the ring. The said hook may however be constructed and arranged in other ways.

When the attachment is swung up over the rear wheel and the chain E is engaged with this hook, the two rods $D^2$ are sprung together and the edges of the covering are caught between the two parts of the double loops or eyes, which assist in holding it in proper relation to the wheel. A chain and hook $E^2$ may also be employed to connect the rods $D^2$ to take the strain off the chain E.

The rods D' may be connected by a cross-arm in the same manner as the rods D, but I prefer the construction as above. Upon the cross arm of the rod D is placed a rubber tube or sleeve G, which when the attachment is in the guard position, contacts with those bars G' of the frame which connect the rear axle with the upper portion of the seat post, and thereby acts as an anti-rattler.

When it is desired to use the attachment for supporting the bicycle, in upright position, the chain E is disengaged from the hook F, and the entire attachment frame is swung around underneath the rear wheel in the position shown in Fig. 1, raising the rear wheel from the ground. When the chain E is disconnected from the hook F, the rods $D^2$ spring apart so that they take a wide bearing and form a secure support for the machine. In case the rods should be made of material not capable of taking a spring temper, they may be hinge jointed near the socket as indicated at H, in order that they may be spread laterally.

When a machine is already supplied with a mud guard, or in case the rider may wish to remove the covering A, retaining the feature of the support, it becomes desirable to provide means whereby such covering and the rods D' may be readily detached from the remainder of the attachment. With this object in view, the covering is attached to the cross arm of the rods D' and to a second cross-arm of the rods D by means of spring clips K, which spring closely around the said arms, but from which they may be readily disengaged.

To form the clips K, the ends of the covering or guard are made of two thicknesses of spring character which are rigidly secured to each other at $k$. At $k'$ they are arched away from each other to form a seat for the rod with which they engage, being again brought into contact with each other at $k^2$, while their end portions are flared away from each other, as indicated at $k^3$. In attaching the covering to the support the two parts of the clips must be forcibly separated at $k^2$ to admit the cross arms or rods. After these rods are admitted the two parts spring together again and the covering cannot be detached until they are again forcibly separated.

The feature of securing the rods D' in the sockets $c^2$ by set screws as above described, provides for the ready detachment of such rods.

In some makes of machines, the rear axle is not sufficiently long to permit the connection of the attachment thereto. In such cases, I provide two clips L each of which has a laterally projecting stud $l$, threaded at its outer portion. These clips are secured to the bars G' near the axle, the said studs forming bearings for the socket pieces B, B. With this connection, the bushings may be omitted, as the nuts which secure the socket pieces need not be screwed up sufficiently to bind against said pieces.

When used as a support, the attachment raises the wheel from the ground as above stated, which permits the rear wheel to be rotated for inspection or for the purpose of tightening the spokes, or for other repairs, without removing the wheel from the machine.

I prefer in so far as possible to construct the attachment from aluminum, but may employ any other suitable material.

In some instances a straight guard may be desired instead of an arched one. This may be effected by means of a flat piece and by making the rear rods or wires longer.

Having thus described my invention, what I claim as new, and desire to secure by Letters Patent, is—

1. In a combined mud guard and support for bicycles, the sector shaped frame having the angular rods D, D', the socket pieces in which said rods are secured and which are arranged to swing on bearings on the bicycle, said rod D' being detachable from said socket piece, the covering having the split spring lugs K which detachably engage the rods D, D', and the supporting rods on legs $D^2$, substantially as specified.

2. In a mud guard attachment for bicycles, the combination with a frame having cross arms or rods, of the covering or guard proper, having its end portions formed with two thicknesses which are bent to form spring clips K, having the seats $k'$ for the said arms or rods, the contacting portions $k^2$, and the flared ends $k^3$, substantially as specified.

3. The combined mud guard attachment and support for bicycles, comprising a sector shaped frame arranged to swing on bearings of the bicycle, a covering or guard proper secured to said frame, the radial rods or lugs $D^2$ secured to the frame and adapted to be spread laterally, and a chain or the like attached to the free portions of said rods, substantially as specified.

4. The herein described combination mud guard attachment for bicycles, consisting of the socket-pieces B, B, the angular rods D, D' secured in said socket-pieces, the cover secured to said rods, the rods $D^2$ arranged to have a lateral spread, the chain attached thereto, and means for connecting said chain to the bicycle frame, substantially as specified.

5. The herein described combination guard attachment for bicycles, comprising the socket-pieces B, B, adapted for pivotal connection to a bicycle, the radial, angular rods D, D', secured in said socket pieces, the anti-rattler on the cross-arm of the rod D, the covering secured to said rods D, D', the rods $D^2$ also secured in said socket-pieces, and the chain attached to the free portions of said rods $D^2$, substantially as specified.

In testimony whereof I affix my signature in presence of two witnesses.

EDWIN JAY KLINCK.

Witnesses:
GEORGE D. FRANK,
JAMES G. FRENCH.